United States Patent [19]

Papworth et al.

[11] Patent Number: 5,586,278
[45] Date of Patent: Dec. 17, 1996

[54] METHOD AND APPARATUS FOR STATE RECOVERY FOLLOWING BRANCH MISPREDICTION IN AN OUT-OF-ORDER MICROPROCESSOR

[75] Inventors: David B. Papworth, Beaverton; Glenn J. Hinton, Portland, both of Oreg.

[73] Assignee: Intel Corporation, Santa Clara, Calif.

[21] Appl. No.: 639,244

[22] Filed: Apr. 22, 1996

Related U.S. Application Data

[63] Continuation of Ser. No. 204,759, Mar. 1, 1994, abandoned.

[51] Int. Cl.$^6$ ........................................ G06F 9/38
[52] U.S. Cl. ........................... 395/582; 395/586; 395/393
[58] Field of Search ..................... 364/DIG. 1 MS File, 364/DIG. 2 MS File; 395/375, 800

[56] References Cited

U.S. PATENT DOCUMENTS

| | | | |
|---|---|---|---|
| 4,394,736 | 7/1983 | Bernstein et al. | 364/200 |
| 4,399,505 | 8/1983 | Druke et al. | 364/200 |
| 4,591,972 | 5/1986 | Guyer et al. | 364/200 |
| 4,745,544 | 5/1988 | Renner et al. | 364/200 |
| 4,928,223 | 5/1990 | Dao et al. | 364/200 |
| 5,222,244 | 6/1993 | Carbine et al. | 395/800 |

OTHER PUBLICATIONS

Johnson, Mike, "Superscalar Microprocessor Design", Prentice Hall, Inc., 1991, pp. 1–287.

*Primary Examiner*—Robert B. Harrell
*Attorney, Agent, or Firm*—Blakely, Sokoloff, Taylor & Zafman

[57] ABSTRACT

A method of state recovery following a branch misprediction or an undetected branch instruction. If, during execution of a branch instruction in an out-of-order unit, it is determined that the branch has been mispredicted, or if a taken branch has not been detected, then a JEClear signal is asserted to flush the instruction fetch unit and decoder section, and to change the instruction pointer to the actual target address. Within the out-of-order section, the instructions preceding the branch instruction are allowed to continue execution and proceed to in-order retirement. Simultaneously, instructions fetched at the actual target address are decoded, but not allowed to issue therefrom until the branch instruction has been retired from the out-of-order section, after which all instructions within the out-of-order section are flushed, and then decoded instructions are allowed to issue from the decoder. The state recovery method advantageously provides efficient utilization of processor time.

18 Claims, 7 Drawing Sheets

METHOD AND APPARATUS FOR STATE RECOVERY FOLLOWING BRANCH MISPREDICTION IN AN OUT-OF-ORDER MICROPROCESSOR

This is a continuation of application Ser. No. 08/204,759, filed Mar. 1, 1994, now abandoned.

Cross-reference is made to a commonly assigned copending patent application entitled "Method and Apparatus for Implementing a Four Stage Branch Resolution System in A Computer Processor", Ser. No. 08/176,785, now abandoned filed Jan. 3, 1994, which is incorporated by reference herein.

BACKGROUND OF THE INVENTION

1. Field of the Invention

The present invention relates to state recovery in processors including an out-of-order execution section. Specifically, the present invention relates to recovery mechanisms for recovering processor state following a branch misprediction.

2. Description of Related Art

In order to increase processing speed of computer processors, "pipelined" structures have been developed. A pipelined computer processor includes a plurality of stages that operate independently of each other. When a first instruction has completed execution in one of the pipeline stages, the instruction moves on to the next stage, and a second instruction moves into the stage vacated by the first instruction. Any point in time, multiple instructions are being processed simultaneously in the pipeline because each stage may hold an instruction. For example, at one instant in time, a ten-stage pipeline may be processing ten instructions. In order to further increase processing speed, processors termed "superscalar" processors have been designed with multiple pipelines that process instructions simultaneously when adjacent instructions have no data dependencies between them. Even greater parallelism and higher performance can be provided by an out-of-order processor that includes multiple parallel units, in which instructions are processed in parallel in any efficient order that takes advantage of whatever opportunities for parallel processing that may be provided by the instruction code.

Out-of-order processing can greatly increase throughput over conventional processing in which instructions are processed sequentially one after the other. However, out-of-order processing greatly increases complexity over a simple sequential processor. One area of increased complexity relates to state recovery following an unpredicted change of instruction flow. At any particular time during execution, the out-of-order execution section may have many instructions in the execution stage, some awaiting scheduling, some being executed, and some having completed execution but awaiting retirement. In the event that a change of instruction flow is detected during execution of an instruction, the instructions preceding that instruction must proceed to retirement, but the instructions following the instruction flow changing instruction should be discarded. In other words, the state of the processor at the time of the change in instruction flow must be recovered in order for execution to continue properly. State recovery puts the pipeline in the state that it would have been had those instructions not been processed. Due to the heavily pipelined nature (i.e., many stages), and the large number of instructions that may be in the out-of-order section, a state recovery mechanism must be established in such a way to efficiently and correctly recover state following a branch misprediction, an exception, or an interrupt.

Therefore, one particular problem with pipelined processing is the issue of state recovery following an unexpected change of instruction flow, which can be caused by internal or external events such as interrupts, problems with program execution such as exceptions, and explicit instructions such as branches, calls, and returns. Each of those occurrences may give rise to a situation where multiple instructions within the pipeline must be flushed and the state recovered.

For efficient processing of instructions, the number of instructions to be flushed should be kept to a minimum, and the mechanism that accomplishes the flushing should be as efficient as possible. However, implementation of an efficient flushing and state recovery mechanism can be difficult. Often, the actual target instruction cannot be verified with certainty until a number of subsequent instructions are already in various processing stages within the pipeline. For example, a target of a branch instruction cannot be known with certainty until after the instruction has been executed.

A branch instruction is an instruction that expressly changes the flow of program. Branch instructions can be conditional or unconditional: an unconditional branch instruction is always taken, and a conditional branch instruction is either "taken" or "not taken" dependent upon the results of the condition expressed within the instruction. The "takenness" of an unconditional branch is not known with certainty until the time of execution of the branch instruction, when many instructions have already subsequently entered the pipeline. In order to avoid waiting until after the branch instruction has been executed, many processors predict a branch target before the execution stage. If the prediction turns out to be incorrect, then the state following the branch is flushed, and the actual target is fetched. Branch prediction has been proven highly effective at increasing the performance of pipelined computer processors.

SUMMARY OF THE INVENTION

The present invention provides an efficient method of state recovery following branch mispredictions or undetected branch instructions. During execution of a branch instruction, if it is determined that the branch has been mispredicted, then a JEClear signal is asserted which flushes the instruction fetch unit ("IFU") and the decoder section, and the instruction pointer is changed to the actual target address. The IFU section then begins fetching instructions at the actual target address. While the IFU is fetching instructions, instructions preceding the branch instruction are allowed to continue execution and proceed to in-order retirement within the out-of-order execution section. At the same time, instructions fetched beginning at the new target may be decoded in the decoder unit, but are not allowed to issue therefrom to the out-of-order section until the branch instruction is retired. Upon retirement of the branch instruction, all instructions within the out-of-order section (which necessarily sequentially follow the branch) are flushed by assertion of an ROClear signal. Thus, an advantageous method of recovery state following branch misprediction in an out-of-order pipelined processor is provided. One advantage is that, by clearing the IFU and decoder and beginning fetching the actual target before the branch instruction is retired (and the sequential state restored), processing time is saved that would otherwise be lost.

The features and advantages described in the specification are not all inclusive, and particularly, many additional features and advantages will be apparent to one of ordinary skill in the art in view of the drawings, specification and claims hereof. Moreover, it should be noted that the language used in the specification has been principally selected for readability and instructional purpose, and therefore resort to the claims is necessary to determine the inventive subject matter.

DETAILED DESCRIPTION OF THE PREFERRED EMBODIMENT

FIGS. 1 through 5 of the drawings disclose various embodiments of the present invention for purposes of illustration only. One skilled in the art will readily recognize from the following discussion that alternative embodiments of the structures and methods illustrated herein may be employed without departing from the principles of the invention.

Notation and Nomenclature

The detailed descriptions which follow are presented largely in terms of display images, algorithms, and symbolic representations of operations of data bits within a computer memory. These algorithmic descriptions and representations are the means used by those skilled in the data processing arts to most effectively convey the substance of their work to others skilled in the art.

An algorithm is here, and generally, conceived to be a self consistent sequence of steps leading to a desired result. These steps are those requiring physical manipulations of physical quantities. Usually, though not necessarily, these quantities take the form of electrical or magnetic signals capable of being stored, transferred, combined, compared, selected, chosen, modified, and otherwise manipulated. It proves convenient at times, principally for reasons of common usage, to refer to these signals as bits, values, elements, symbols, characters, images, terms, numbers, or the like. It should be borne in mind, however, that all of these and similar terms are to be associated with the appropriate physical quantities and are merely convenient labels applied to these quantities.

In the present case, the operations are machine operations that may be performed in conjunction with a human operator who can program or initiate those operations. Useful machines for performing the operations of the present invention include general purpose digital computers or other similar devices. In all cases, there should be borne in mind the distinction between the method of operating a computer and the method of computation itself. The methods disclosed herein relate to operating a computer and processing electrical or other physical signals to generate other desired physical signals.

Apparatus is also disclosed herein for performing these operations. This apparatus may be specially constructed for the required purposes as described herein or it may comprise a general purpose computer selectively activated or reconfigured by a computer program stored in the computer. The algorithms presented herein are not inherently related to any particular computer or other apparatus except as otherwise noted. In particular, various general purpose machines may sometimes be used with programs in accordance with the teachings herein, or it may prove more convenient to construct more specialized apparatus to perform the required method steps. The required structure for a variety of these machines will appear from the description given below.

Description of a Pipelined Processor

Figure 5:
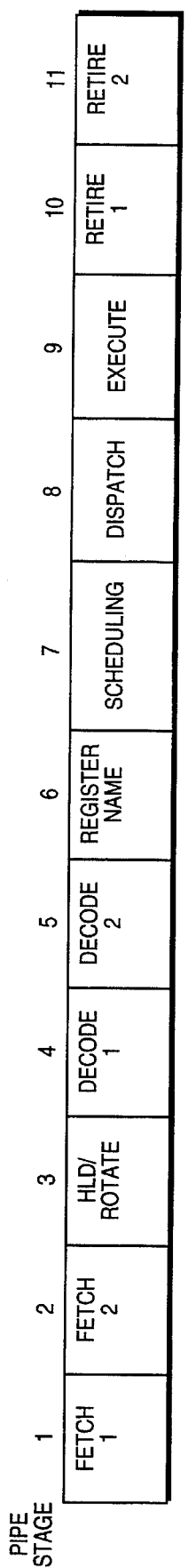
FIG. 5 is a diagram of pipelined instruction flow in a microprocessor including an out-of-order execution section.

Reference is first made to FIG. 5, which illustrates a set of pipeline stages of a deeply pipelined processor. In a deeply pipelined processor, the major stages of a pipelined processor such as fetch, decode, and execute, are divided into several substages such that each major stage is pipelined. In the instruction pipeline of FIG. 5, there are eleven pipeline stages, which is a long pipeline by present day standards.

Located at the head of the instruction pipeline illustrated in FIG. 5 are two instruction fetch substages. (Fetch 1 and Fetch 2) The two instruction fetch substages are responsible for continually fetching new instructions for the instruction pipeline. Unconditional branch instructions within the instruction stream prevent the fetch substages from simply fetching sequential instructions. Furthermore, conditional branch instructions in the instruction stream prevent the fetch substages from simply fetching instructions along a predefined path. The instruction fetch substages therefore fetch future instructions without knowing with certainty exactly where the program is going.

To fetch future instructions, the fetch substages at the head of an instruction pipeline are implemented with a branch prediction mechanism. The branch prediction mechanism predicts where branch instructions exist in the instruction stream and the outcome of these branch instructions. The instruction fetch unit then fetches the stream of instructions predicted by the branch prediction mechanism.

Detailed Description

Figure 1:
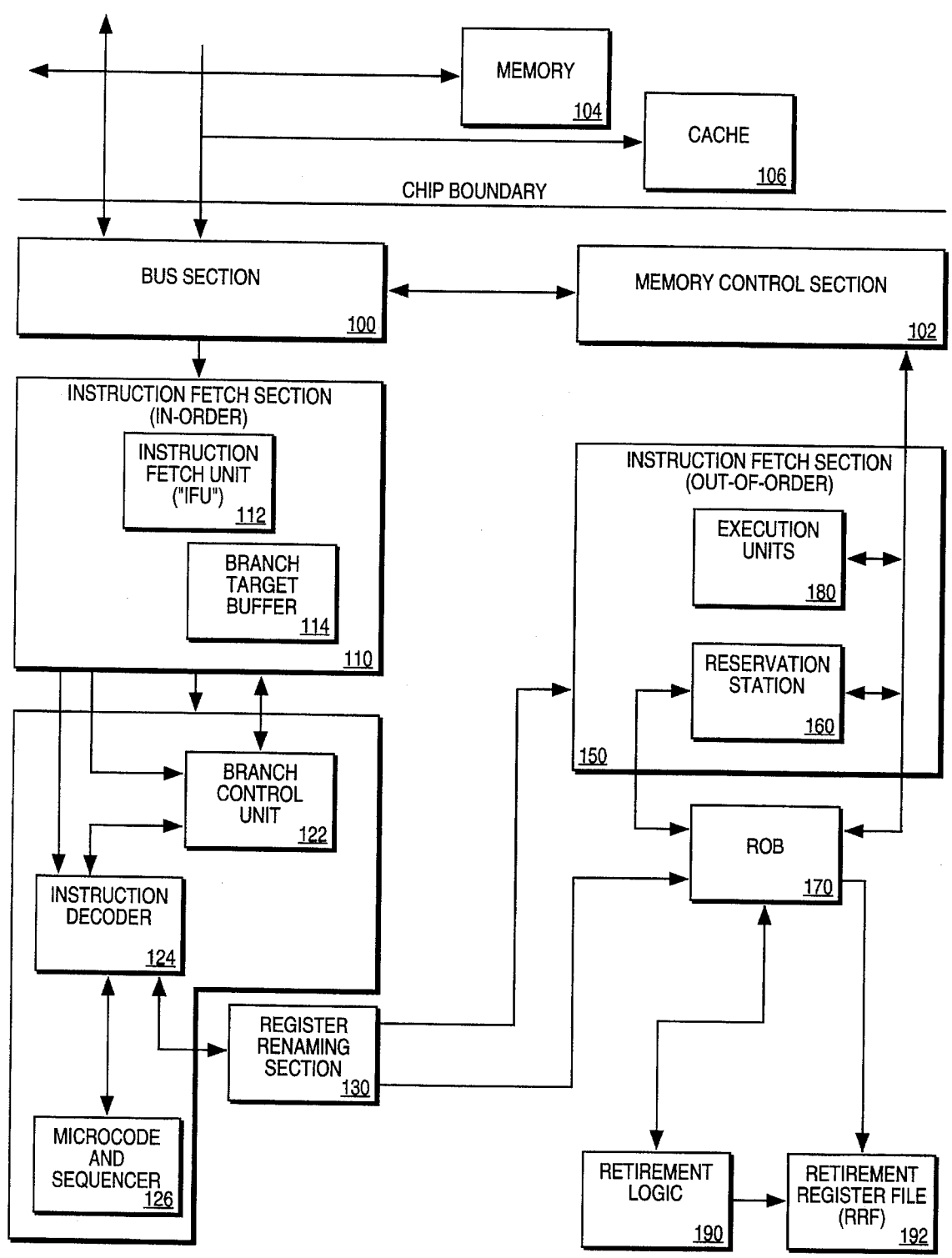
FIG. 1 is a block diagram of a processor including an out-of-order execution section.

Reference is now made to FIG. 1 which is a block diagram of a microprocessor that implements an out-of-order execution section. The blocks within the microprocessor chip include a bus section 100 and a memory control section 102 coupled thereto. A memory 104 and cache 106 are coupled to the bus section 100. Thus, the memory control section 102 can control the bus section 100 to retrieve information from the memory 104 or the cache 106. The memory 104 may be any type of external memory, such as Random Access Memory ("RAM"), disk drives, or other storage media. The cache 106 is utilized to store frequently used instructions or data. The cache may be located on-chip or, as illustrated, off-chip.

The blocks within the chip include an instruction fetch section 110 that fetches instructions in sequential order (i.e., "in-order"). The instruction fetch section 110 includes an instruction fetch unit ("IFU") 112 and a branch target buffer ("BTB") 114 that operates with control logic to perform branch predictions. Any conventional branch prediction mechanism may be used. In one implementation, the branch prediction mechanism may include apparatus and methods described in a commonly assigned copending application, Ser. No. 08/062,057, entitled "Branch Target Buffer with Per-Set Pattern Table", by Bradley D. Hoyt et al., filed Jul. 15, 1993 and Ser. No. 08/062,012, entitled "Speculative History Mechanism in a Branch Target Buffer", by Bradley D. Hoyt et al., filed Jul. 15, 1993. The IFU 112 includes any conventional circuitry and control logic that retrieves data from memory 104 or the cache 106 via section 100. As defined herein, "information" includes instructions and other stored data.

A decoder section 120 includes a branch control unit 122 coupled to the instruction fetch section 110. An instruction decoder 124, which may include any conventional instruction decoder is coupled to the branch control unit 122 and the instruction fetch section 110, to receive macroinstructions therefrom and decode them into a series of micro-operations. A microcode and microcode sequencer 126 are coupled to the instruction decoder 124 to a receive an entry point therefrom, and in response to supply multiple micro-operations for long flows and appropriate control signals.

A register renaming section 130 is coupled to receive instructions from the instruction decoder 124. The register renaming section may include circuitry such as a register allocation table ("RAT"), and an allocator circuit. A function of the register renaming section 130 is to rename the registers specified by the instructions. Options for a register renaming section are discussed for example, in Chapter 6 of "Superscalar Microprocessor Design" by Mike Johnson, Prentice-Hall, Inc., Englewood Cliffs, N.J., 1991, and can be implemented therefrom.

An out-of-order execution section 150 includes a reservation station 160 that is coupled to the register renaming section 130 to receive micro-operations therefrom, and a re-order buffer ("ROB") 170 that is also coupled to the register renaming section 130 to receive micro-operations therefrom. The execution units 80 include a plurality of execution units 180, such as an address generation unit ("AGU"), an integer execution unit ("IEU"), a floating point execution unit ("FEU"), and a memory interface unit ("MUI"). The execution units 180 are coupled to the memory control section 102, the reservation station 160, and the re-order buffer 170.

Retirement logic 190 is coupled to the ROB 170. A retirement register file ("RRF") is coupled to the retirement logic 190 and the ROB 170. When the retirement logic 190 determines that an instruction that has an entry in the ROB 170 has completed execution and is ready to retire, it stores the information into the retirement register file (RRF) 192. More details of a register renaming section 130, ROB 170, retirement logic 190, RRF 192, and related circuitry can be found in an application entitled, "Speculative and Committed Resource Files in an Out-of-Order Processor", Ser, No. 08/177,244, filed Jan. 4, 1994, which is incorporated by reference herein. The re-order buffer 170 is discussed in further detail with reference to FIG. 2.

Figure 2:
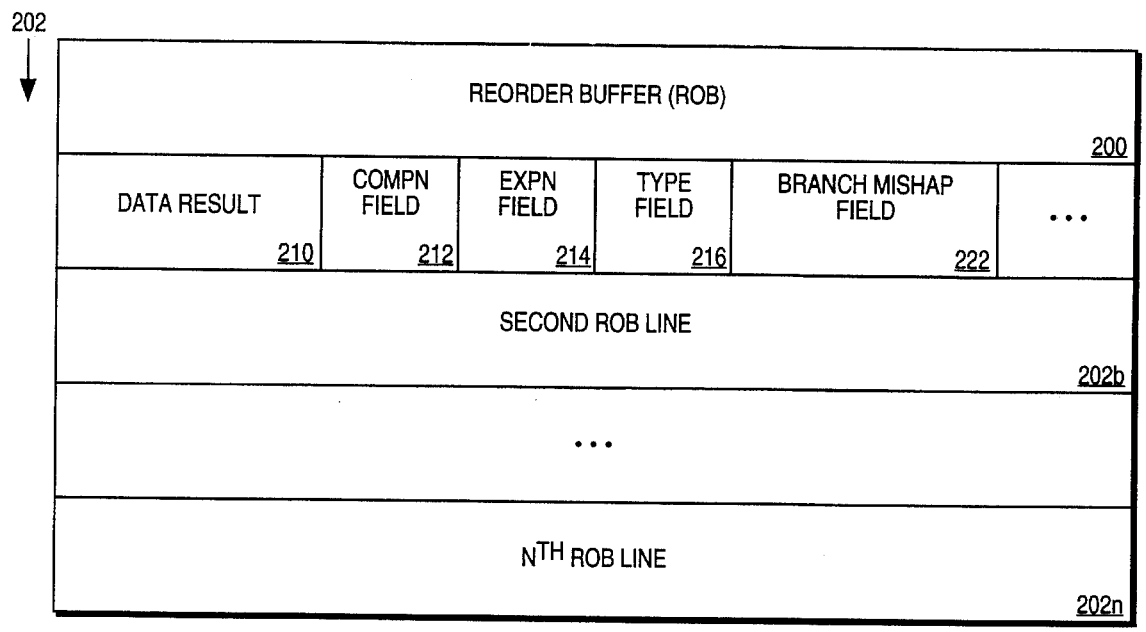
FIG. 2 is a diagram of a re-order buffer (ROB), illustrating entries and fields in each entry.

Reference is now made to FIG. 2 which is a diagram of a re-order buffer (ROB) 200. The ROB 200 includes a plurality of ROB data lines 202 including a first ROB line 202a, a second ROB line 202b, and a predetermined number of additional ROB data lines up to an $n^{th}$ ROB line 202n, which number will vary with different implementations.

Each ROB data line 202 includes a plurality of fields which are the same for each ROB line 202. The fields which are illustrated in the first ROB line 202a, include a data result field 210 and a completion field 212 which may be a single bit indicative of whether the operation associated with that line has been completed or not. An exception (EXPN) field 214 is an exception bit that indicates whether or not an exception is associated with that operation. A type (TYPE) field 216 illustrates the type of exception that was found. The type field 216 includes any number of bits necessary to uniquely identify the exception. A branch bit 220 is included to indicate whether or not the instruction is a branch instruction. A misprediction (MISP) field 222 is provided to indicate whether the branch was mispredicted or not. The MISP field 222 is useful during retirement to indicate whether or not the ROClear signal should be asserted as illustrated in a box 358 to be described, which flushes the out-of-order execution section 150 and the ROB 170. Each ROB line 202 may also include other fields, dependent upon the implementation.

Figure 3A:
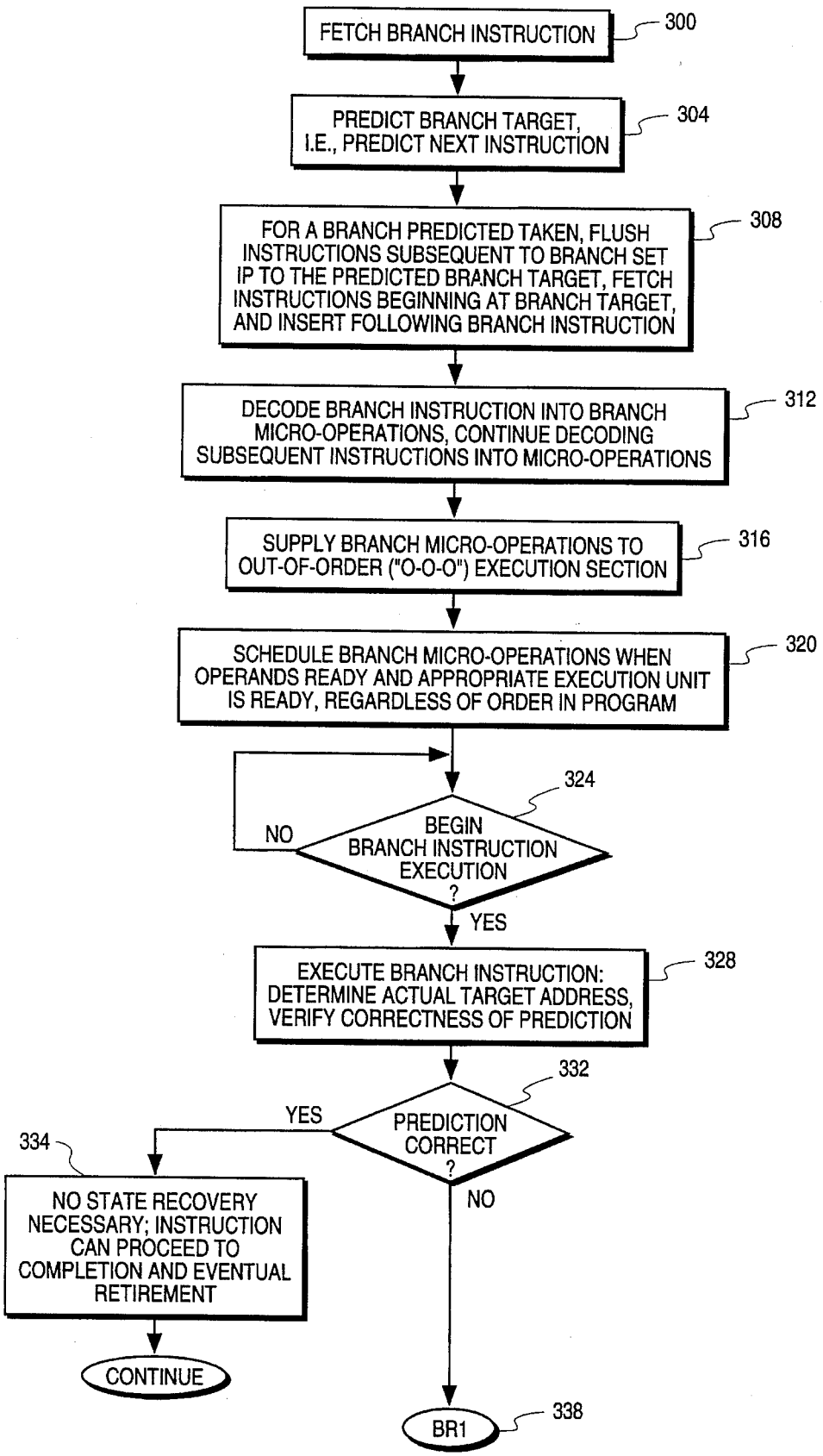
FIGS. 3A and 3B are flow charts of branch instruction execution including branch misprediction and recovery.
Figure 3B:
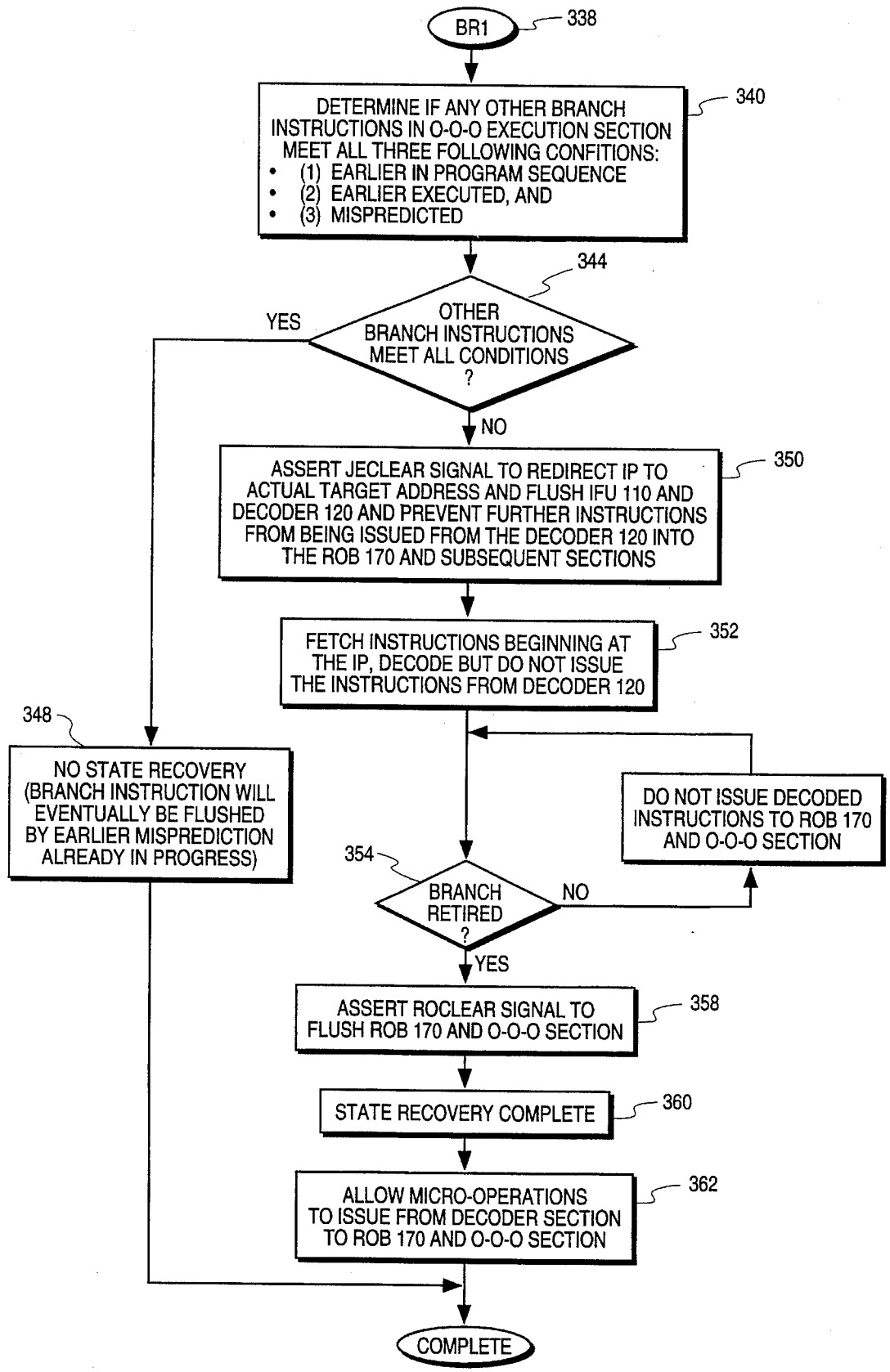

Reference is made to FIGS. 3A and 3B which when placed together illustrate a flow chart of operations including processing a branch instruction and branch recovery following misprediction. In a box 300, a branch instruction is fetched by the instruction fetch section 110. The branch instruction is supplied from any suitable source of instructions in any conventional manner. For example, the branch instruction may be one of a sequence of instructions fetched from the memory 104 (FIG. 1) into the cache 106, and then supplied from the cache 106.

Next, in a box 304, a branch target may be predicted. Specifically, the box 304 may include operations to predict if the branch target is taken or not taken, and make a prediction accordingly. Any conventional branch prediction mechanism may be used. The branch target buffer 114, in which prediction is performed, may include apparatus described in a commonly assigned copending application, Ser. No. 08/062,057, entitled "Branch Target Buffer with Per-Set Pattern Table", by Bradley D. Hoyt et al., filed Jul. 15, 1993 and Ser. No. 08/062,012, entitled "Speculative History Mechanism in a Branch Target Buffer", by Bradley D. Hoyt et al., filed Jul. 15, 1993. Branch prediction in the box 304 also includes the instance in which the branch instruction is not detected and therefore the branch is predicted "not taken". In some instances such as an unconditional branch, the branch instruction is always predicted to be taken. Some operations within the box 304 may take place during decoding. For example, unconditional branches may be detected by branch control unit 122, and a target address predicted accordingly.

Following branch prediction from the box 304, operation moves to a box 308 which flushes the instructions following a branch that is predicted taken. The instruction pointer ("IP") is changed to conform with the predicted branch target. Thereafter, instructions are fetched beginning at the predicted branch target and inserted sequentially following the branch instruction. Operation then moves to a box 312, in which the branch instruction is decoded into one or more branch micro-operations. The instructions following the branch instruction are also decoded into micro-operations, either in parallel with the branch instruction, or sequentially.

Following decoding from the box 312, in a box 316 the branch micro-operations are supplied to the out-of-order section. Particularly, each micro-operation is sequentially allocated an entry in the re-order buffer (ROB) 170, discussed in further detail with reference to FIG. 2. The following micro-operations are also supplied sequentially to the ROB 170, each receiving a ROB line. From the ROB 170, each instruction is scheduled, as illustrated in a box 320, when all necessary operands are ready. After all operands are ready and an execution unit is available for this instruction, execution begins as illustrated in a decision box 324. Operation then moves to a box 328 for execution of the branch instruction. Execution includes operations to determine the actual target address and compare it with the predicted target address. Operation next moves to a box 332, which illustrates that if execution shows that the prediction is correct, then operation moves to a box 334, which illustrates that no state recovery is required because the sequentially following instructions are correct. Therefore, no further operations are necessary to recover state, and the branch instruction can then proceed to completion and eventual retirement in the RRF 192 (FIG. 1). However, if in the decision box 332 the prediction is not correct, then operation moves via a BR1 box 338 to a box 340 illustrated in FIG. 3B.

Reference is now made to FIG. 3B. In the box 340, execution of the current branch instruction following a determination of misprediction includes determining if any other branch instruction in the out-of-order execution section meets specified requirements: (1) it is earlier in the program sequence (i.e., the other instruction precedes the current instruction), (2) it was earlier executed, and (3) it was mispredicted. If, in a decision box 344, it is determined that all the requirements are met, then as illustrated in a box 348, no state recovery is necessary, because the current branch instruction will eventually be flushed by the earlier misprediction and processing of the following instructions continues without interrupt and operation is then complete. However, if in the decision 344 all conditions are not met, then operation moves to a box 350 in which a JEClear signal is asserted to clear the instruction fetch section 110 and the decode section 120, and the instruction pointer (IP) is changed to point to the actual target address. Then, as illustrated in a box 352, instructions are fetched by the IFU 110 and decoded beginning at the new instruction pointer. In the event that the newly fetched instructions are processed through to the end of the IFU 110, and decoder section 120, then as illustrated in the box 352 and in a decision 354 the instructions are not allowed to issue into the ROB 170 and the out-of-order section. Then, no further operations are performed until the branch is retired, as illustrated in a decision box 354. Subsequent to the branch being retired, the ROClear signal is asserted to flush the out-of-order execution section as illustrated in a box 358 and operation continues.

Figure 4A:
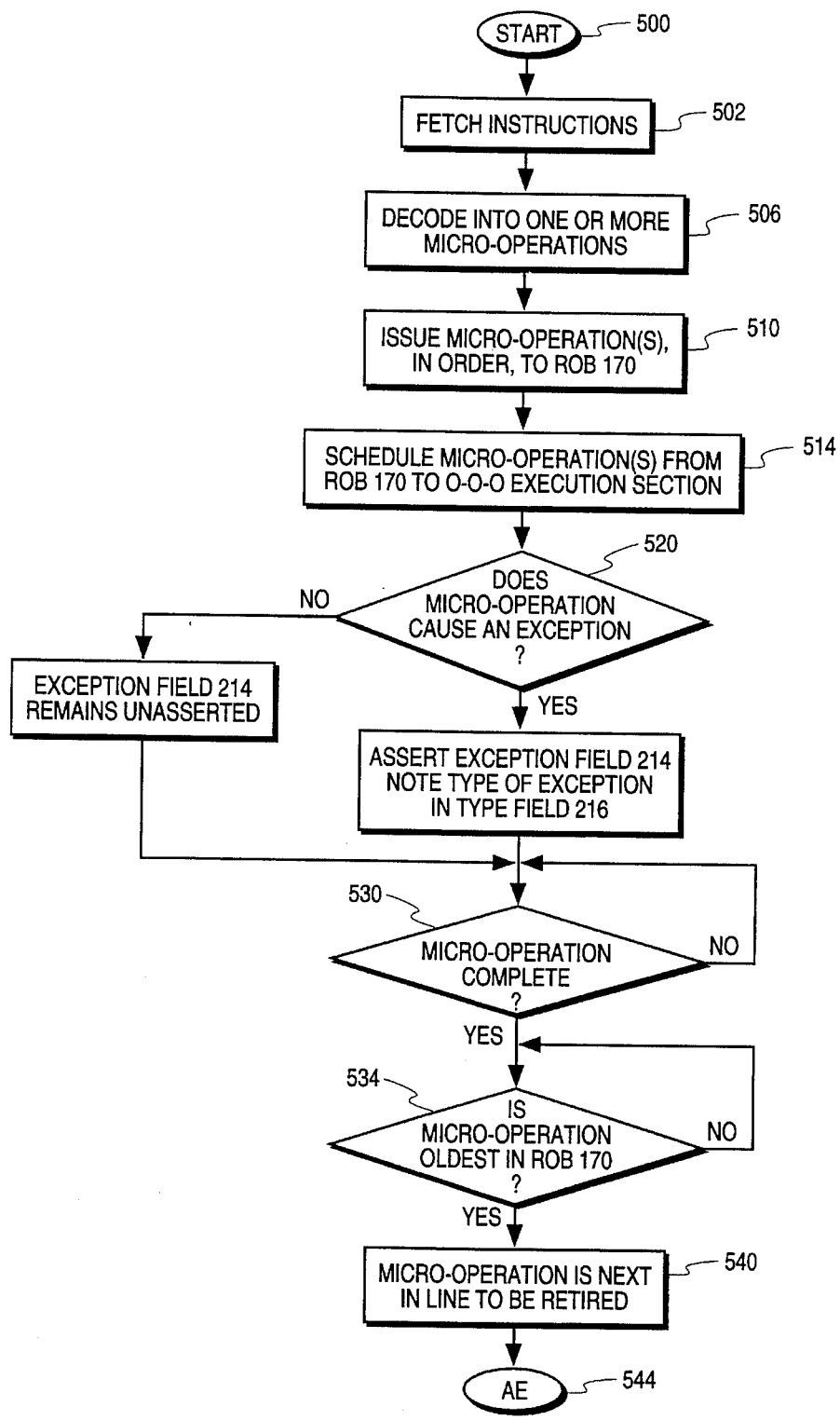
FIGS. 4A and 4B are flow charts of state recovery following an exception-causing instruction or an interrupt.
Figure 4B:
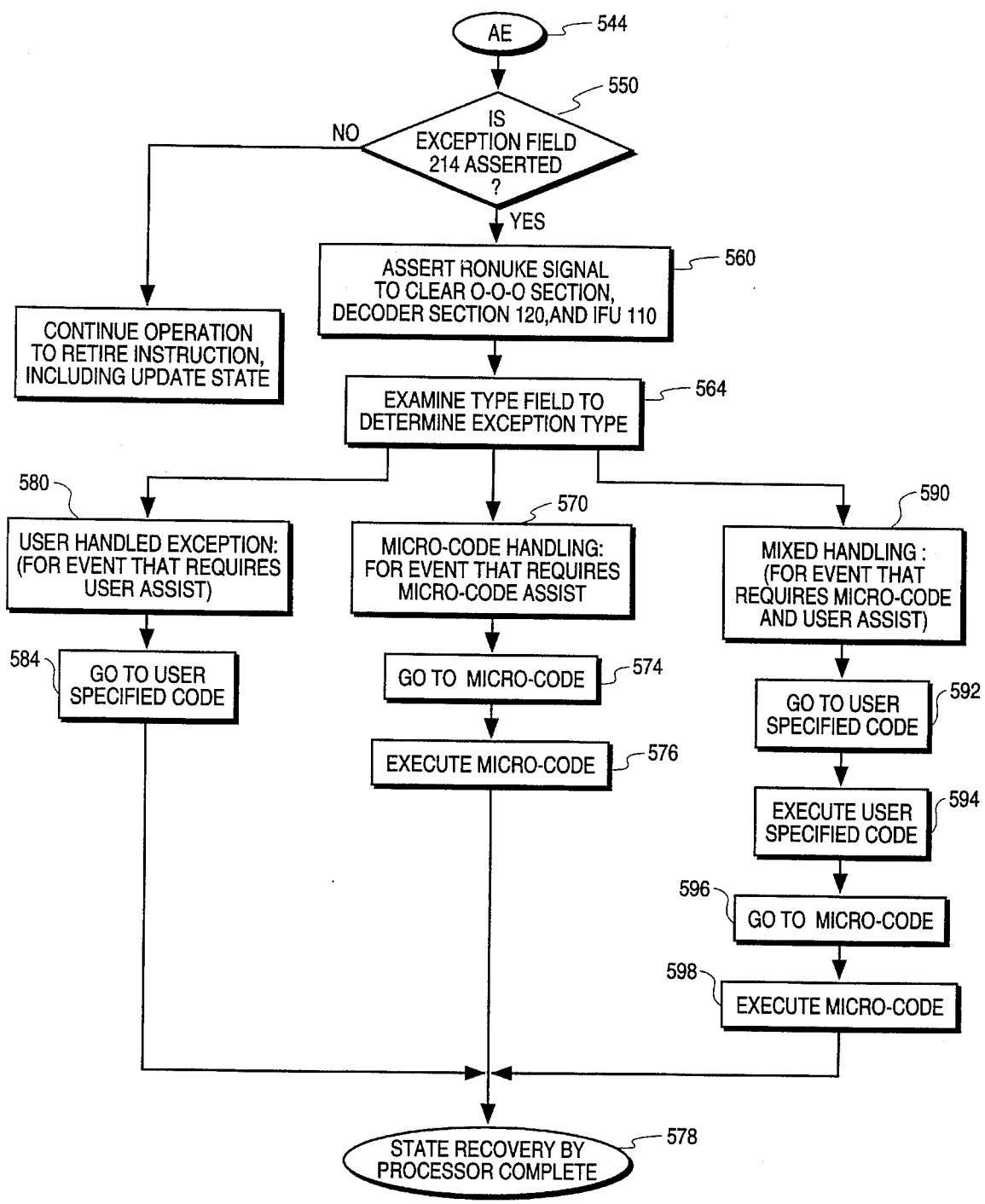

Reference is now made to FIGS. 4A and 4B which together show a flow chart illustrating operations including state recovery following an exception and/or an interrupt. The flow chart in FIGS. 4A and 4B follows an instruction through the pipeline for purposes of illustrating the effect of an exception, and the effect of an interrupt that occurs during execution. It should be recognized that many instructions are in the pipeline at any particular point in time and that the single instruction is followed for illustrative purposes.

Operation starts in a box 500. In a box 502, an instruction is fetched in any conventional manner. The instruction in a box 506 is decoded into one or more micro-operations. In a box 510, the micro-operations are supplied, in order, to the ROB 170. In a box 514, the micro-operations are scheduled to be executed in the 0-0-0 execution section in a convenient manner. Particularly, from the ROB 170, the micro-operations are scheduled for execution in the 0-0-0 execution units 150 when all operands are ready and the appropriate execution unit is available. If during processing one of the micro-operations causes an exception, as illustrated in a decision 520, then operation moves to a box 524 in which the exception field 214 is asserted within the re-order buffer 200, and the type of exception is noted in the type field 216. However, if the micro-operation does not cause an exception, then processing moves from the decision 520 to a box 528 in which the exception field 214 remains unasserted. Operation then moves from the boxes 524 and 528 to a decision 530 which indicates that the system waits until the operation is complete (i.e., execution is complete). Next, operation moves to a decision 534 which indicates that further processing of the completed instruction waits until the micro-operation is the oldest one in the ROB 170. Then operation moves to a box 540 in which the micro-operation is next in line to be retired into the RRF 192. Subsequently, operation moves to the AE box 544 which links FIG. 4A with FIG. 4B.

Reference is now made to FIG. 4B. From the AE box 544, operation moves to the box 550, in which the ROB entry next in line is examined and a decision is made as to whether the exception field 214 indicates the existence of an exception. If from the decision box 550, the exception field 214 is unasserted, then operation continues as illustrated in a box 554, the next oldest instruction is retired as illustrated in a box 556, and operation continues as illustrated in a box 558. However, if from the decision 550, the exception field 214 is determined to be asserted, then the RONuke signal is asserted, as illustrated in a box 560, which clears all the processing units currently processing instructions, including the IFU 110, the decoder section 120, the ROB 170, and the out-of-order execution section 150.

Next, operation moves to a block 564 in which the type field 216 in the re-order buffer 200 is utilized. From the box 564, a branch may occur in one of several different directions, dependent upon the type of exception as indicated in the type field 216. If microcode handling is required, for example upon occurrence of an event that requires a microcode assist, then operation moves to the box 570. Subsequently, in a box 574 operation moves to a box 574 in which control is transferred to microcode. Next, as illustrated in a box 576 the microcode is executed. At that point, operation moves to the box 578 which indicates that recovery is complete.

However, if from the box 564 the type field indicates that it is a user handled exception, such as for an event that requires a user assist, then operation moves to the box 580. Subsequently, operation moves to the box 584 in which control is transferred to the user specified code. Then, as illustrated in a box 578, recovery by the processor is now complete.

However, if from the box 564 the type of exception is an event that requires mixed handling (in other words it requires microcode and user assists), then operation moves to the box 590. Subsequently, operation moves to the box 592 in which the operation moves to a user specified code, and is illustrated in the box 594, the user specified code is executed. Subsequently, control is returned to the microcode as illustrated in a box 596 and the microcode is executed as illustrated in a box 598. Then, as illustrated in a box 578, recovery by the processor is complete. During the execution of the microcode or the user specified code as illustrated in any of the boxes 584, 576, 594, or 598, it is possible that the instruction pointer may be changed or updated. The instruction pointer is maintained within the retirement register file 192, and is accessed or changed as necessary to handle the exception. For example, if re-execution of the instruction is required, then the microcode or the user code can accomplish this by adjusting the instruction pointer accordingly.

From the above description, it will be apparent that the invention disclosed herein provides a novel and advantageous method and apparatus for recovery from a mispredicted branch. The foregoing discussion discloses and describes exemplary methods and embodiments of the present invention. As will be understood by those familiar with the art, the invention may be embodied in other specific forms without departing from its spirit or essential characteristics, and thus, the described embodiment is not restrictive of the scope of the invention. The following claims are indicative of the scope of the invention. All variations which come within the meaning and range of equivalency of the claims are to be embraced within their scope.

What is claimed is:

1. A circuit implemented method of handling exceptions in a pipelined out-of-order microprocessor, said pipelined out-of-order microprocessor comprising an instruction fetch section, a decoder section, a register renaming section, an out-of-order section, and an execution section, said method comprising the steps of:

fetching consecutive instructions using said instruction fetch section;

decoding said instructions within said decoder section to generate decoded instructions;

placing said decoded instructions in a reorder buffer of said out-of-order section using said register renaming section;

executing said instructions in said execution section and storing executed instruction results back into said reorder buffer;

retiring said executed instruction results in an original program order, said step of retiring comprising the substeps of testing an exception field associated with executed instruction results stored said reorder buffer; and handling an exception if said exception field indicates an exception occurred during instruction execution.

2. The circuit implemented method of claim 1 wherein said step of handling an exception further comprises the step of testing an exception type field and handling said exception based upon an exception type specified in said exception type field.

3. The circuit implemented method of claim 2 wherein said step of handling an exception further comprises the step of detecting a user exception in said exception type field; and restarting said instruction fetch section using a user exception handing address.

4. The circuit implemented method of claim 2 wherein said step of handling an exception further comprises the step of detecting a microcode handled exception in said exception type field; and loading exception handling microcode into said reorder buffer; and executing said exception handling microcode.

5. The circuit implemented method of claim 1 wherein said step of handling an exception further comprises the step of flushing said instruction fetch section;

flushing said decoder section; and flushing said reorder buffer in said out-of-order section.

6. The circuit implemented method of claim 1 wherein said step of handling an exception further comprises the step of adjusting an instruction pointer in a retirement register file; and restarting said instruction fetch unit to execute at said instruction pointer.

7. A microprocessor for executing instructions, said microprocessor comprising:

an instruction fetch section for fetching instructions in an original program order;

a decoder section for decoding said instructions to generate decoded instructions;

a register renaming section for scheduling said decoded instructions;

an out-of-order section for handling said decoded instructions out of said original program order, said out-of-order section comprising a reorder buffer for storing decoded instructions;

an execution section for executing said instructions out of said original program order, said execution section storing executed instruction results back into said reorder buffer; and retirement logic, said retirement logic retiring said executed instruction results in said original program order, said retirement logic testing an exception field associated with executed instruction results stored said reorder buffer and handling an exception if said exception field indicates an exception occurred during instruction execution.

8. The microprocessor of claim 7 wherein said retirement logic tests an exception type field and handles said exception based upon an exception type specified in said exception type field.

9. The microprocessor of claim 8 wherein said retirement logic detects a user exception in said exception type field and restarts said instruction fetch section using a user exception handing address.

10. The microprocessor of claim 8 wherein said retirement logic detects microcode handled exception in said exception type field and loads exception handling microcode into said reorder buffer to handle said exception.

11. The microprocessor of claim 7 wherein said retirement logic flushes said instruction fetch section, said decoder section, and said reorder buffer when an exception is detected.

12. A circuit implemented method of executing branch instructions in a pipelined out-of-order microprocessor, said pipelined out-of-order microprocessor comprising an instruction fetch section, a section, a register renaming section, an out-of-order section, and an execution section, said method comprising the steps of:

predicting a predicted branch target address of a branch instruction using said instruction fetch section;

decoding said branch instruction within said decoder section to generate a decoded branch instruction;

placing said decoded branch instruction in a reorder buffer of said out-of-order section using said register renaming section;

executing said branch instruction in an execution unit of said execution section to determine a final branch target address;

comparing said predicted branch target address with said final branch target address;

correcting for a mispredicted branch instruction when said predicted branch target address does not match said final branch target address by performing the substeps of flushing said instruction fetch section and restarting said instruction fetch section with said final branch target address;

blocking said register renaming section from instructions from placing in said reorder buffer of said out-of-order section until said branch instruction is retired;

retiring said branch instruction using retirement logic of said out-of-order section and flushing said reorder buffer; and unblocking said register renaming section such that instructions may again be placed in said reorder buffer of said out-of-order section.

13. The circuit implemented method of claim 12 wherein the step of correcting for a mispredicted branch is not performed if an earlier mispredicted branch instruction exists in said reorder buffer.

14. The circuit implemented method of claim 12 wherein said retirement logic retires instructions in said reorder buffer in an original program order.

15. The circuit implemented method of claim 12 wherein said decoded branch instruction comprises one or more micro-operations.

16. The circuit implemented method of claim 12 further comprising the step of predicting said branch instruction within an instruction stream using said instruction fetch section.

17. A state recovery method for recovering state following branch misprediction in a processor that includes an instruction fetch unit and a decoder section having a branch prediction mechanism, said processor including a re-order buffer (ROB) coupled to the decoder section and an out-of-order execution section coupled to the ROB, said out-of-order execution section including a branch execution unit, said processor including an in-order retirement section coupled to the ROB and the out-of-order execution section to retire the results therefrom in-order, said state recovery method comprising the steps of:

(a) executing an execution-verifiable branch instruction in said branch execution unit including determining an actual target address and determining whether said branch instruction is taken or not taken, and thereby determining whether the subsequent instruction following the branch instruction is correct;

(b) if the instruction following the branch instruction is correct, then continuing execution of subsequent instructions in said out-of-order execution unit, otherwise, determining if there is any other branch instruction in the out-of-order execution section is (1) earlier in the program sequence, (2) earlier executed, and (3) mispredicted, and if so, then continuing execution of subsequent instructions in said out-of-order execution unit, but if not, then performing the following steps (c) and (d);

(c) asserting a JEClear signal thereby clearing the instruction fetch unit and the decoder section, changing the instruction pointer to point to the actual branch target address computed in the step (a), and then fetching and decoding instructions in the instruction fetch unit section beginning at said actual branch target address, but not issuing any of said instructions to the out-of-order execution section until after the following step (d) has been completed; and (d) waiting until the branch instruction has retired, and then asserting an ROClear signal to flush the out-of-order execution section and then allowing instructions to issue to the out-of-order execution section.

18. A speculative branch instruction processing method in a pipelined microprocessor that includes an instruction fetch unit and a decoder section for fetching, decoding, and issuing instructions to an out-of-order execution section, said speculative branch instruction processing method comprising the steps of:

(a) predicting a branch location responsive to a branch instruction in the instruction fetch unit;

(b) fetching and decoding a sequence of instructions beginning at said branch location;

(c) if it is subsequently determined that the instruction following the branch instruction was correctly predicted, then continuing execution without changing instruction flow, but otherwise, determining if there is any other branch instruction in the out-of-order section that is (1) earlier in the program sequence, (2) earlier executed, and (3) mispredicted, and if so, then continuing execution without changing instruction flow, but if not, then continuing with the following steps (d) and (e);

(d) asserting a JEClear signal to clear the instruction fetch unit and the decoder section, changing the instruction pointer to the actual branch target, and then continuing processing in the instruction fetch unit and decoder section, but issuing none of the decoded operations to the out-of-order execution section until after the following step (e) has completed; and (e) when said branch instruction has completed execution, and it is an oldest entry in the reorder buffer, then asserting an ROClear signal retiring said branch instruction and that cause the steps of:

(e)(1) flushing the out-of-order execution unit, and (e)(2) supplying instructions from the decoder section to the out-of-order execution unit.

* * * * *

UNITED STATES PATENT AND TRADEMARK OFFICE
CERTIFICATE OF CORRECTION

PATENT NO.    :   5,586,278
DATED         :   December 17, 1996
INVENTOR(S)   :   Papworth et al.

It is certified that error appears in the above-identified patent and that said Letters Patent is hereby corrected as shown below:

In column 10 at line 36 insert --decoder-- following "a" and prior to "section"

Signed and Sealed this

Twentieth Day of May, 1997

Attest:

BRUCE LEHMAN

Attesting Officer         Commissioner of Patents and Trademarks